United States Patent
Farhadi (10) Patent No.: US 9,479,891 B2
(45) Date of Patent: Oct. 25, 2016

(54) COMMUNICATION TRANSMISSION SYSTEM

(75) Inventor: Golnaz Farhadi, Sunnyvale, CA (US)

(73) Assignee: FUJITSU LIMITED, Kawasaki (JP)

( * ) Notice: Subject to any disclaimer, the term of this patent is extended or adjusted under 35 U.S.C. 154(b) by 583 days.

(21) Appl. No.: 13/517,501

(22) Filed: Jun. 13, 2012

(65) Prior Publication Data

US 2013/0336206 A1 Dec. 19, 2013

(51) Int. Cl.
*H04W 4/00* (2009.01)
*H04W 88/04* (2009.01)
*H04W 88/18* (2009.01)

(52) U.S. Cl.
CPC ............ *H04W 4/005* (2013.01); *H04W 88/04* (2013.01); *H04W 88/182* (2013.01)

(58) Field of Classification Search
USPC .......................... 370/252, 328, 338, 401, 465
See application file for complete search history.

(56) References Cited

U.S. PATENT DOCUMENTS

| | | | | |
|---|---|---|---|---|
| 5,768,688 A * | 6/1998 | Owada | ............ | H04B 17/20 455/424 |
| 2004/0203936 A1* | 10/2004 | Ogino | ............ | H04M 1/72513 455/463 |
| 2009/0022116 A1* | 1/2009 | Walley | ............ | H04W 84/18 370/338 |
| 2010/0111023 A1 | 5/2010 | Pelletier et al. | | |
| 2010/0265842 A1* | 10/2010 | Khandekar | ....... | H04W 72/0433 370/252 |
| 2011/0248867 A1* | 10/2011 | Lee | ............ | G08G 1/0104 340/905 |
| 2012/0063428 A1 | 3/2012 | Ng et al. | | |
| 2012/0195258 A1* | 8/2012 | Zhou | ............ | H04W 4/08 370/328 |
| 2012/0207163 A1* | 8/2012 | Schrum | ............ | H04L 12/46 370/392 |
| 2012/0320919 A1* | 12/2012 | Baliga | ............ | H04L 45/125 370/392 |
| 2013/0148618 A1* | 6/2013 | Navratil | ............ | H04W 72/04 370/329 |
| 2014/0056221 A1* | 2/2014 | Li | ............ | H04W 4/005 370/328 |
| 2014/0213252 A1* | 7/2014 | Jung | ............ | H04W 8/186 455/435.1 |

OTHER PUBLICATIONS

International Search Report and Written Opinion dated Jun. 10, 2013 in application No. PCT/US2013/032327.
Zte, "R2-104662: MTC Simulation Results with Specific Solutions," 3GPP TSG RAN WG2 Meeting 71, Aug. 2010.
Chao et al., "Power saving for machine to machine communications in cellular networks," in IEEE GLOBECOM Workshop on M2M Communications., Dec. 2011, pp. 389-393.
Xing et al., "An Experimental Study on Wi-Fi Ad-Hoc Mode for Mobile Device-to-Device Video Delivery", IEEE Workshop on Mobile Video Delivery, INFOCOM 2009, pp. 1-6.
3GPP TS 23.060: "General Packet Radio Service (GPRS) Service description Stage 2 (Release 11)", 2012.

(Continued)

*Primary Examiner* — Ricky Ngo
*Assistant Examiner* — Christine Ng
(74) *Attorney, Agent, or Firm* — Maschoff Brennan (57) ABSTRACT

In an example embodiment, a delegate terminal may include a first wireless inter-terminal interface, a processing device; and a computer storage medium. The computer storage medium may have computer instructions stored thereon that are executable by the processing device to perform operations. The operations may include receiving transmissions from multiple terminals via the first wireless inter-terminal interface. The transmissions may be aggregated from the multiple terminals into an aggregated transmission. The aggregated transmission may be transmitted to a base station of a radio access network.

16 Claims, 7 Drawing Sheets

(56) References Cited

OTHER PUBLICATIONS

Doppler et al., "Mode Selection for Device-to-Device Communication Underlaying an LTE-Advanced Network," IEEE Wireless Communications and Networking Conference (WCNC), Sydney, Australia, Apr. 2010, pp. 1-6.
Fodor et al. "Design Aspects of Network Assisted Device-to-Device Communications," IEEE Commun. Magazine, Mar. 2012, vol. 50, Issue 3, pp. 170-177.
Ziouva et al., "CSMA/CA performance under high traffic conditions: throughput and delay analysis," Computer Communications, Feb. 2002, vol. 25, No. 3, pp. 313-321.
Wang et al., "Throughput Modeling and Fairness Issues in CSMA/CA Based Ad hoc networks," IEEE INFOCOM 2005, Miami, vol. 1, pp. 23-34.
Durvy et al., "Border Effects, Fairness, and Phase Transition in Large Wireless Networks," IEEE INFOCOM 2008, Phoenix, pp. 601-609.
Choi et al., "Automatic Configuration of Random Access Channel Parameters in LTE Systems," Wireless Days, Oct. 2011, pp. 1-6.
"Skellam Distribution", Wikipedia, The Free Encyclopedia, Wikimedia Foundation, Inc., Jun. 18, 2012, <http://en.wikipedia.org/wiki/Skellam_distribution>.
Lien et al., "Toward ubiquitous massive accesses in 3GPP machine-to-machine communications", IEEE Communications Magazine, Apr. 2011, vol. 49, No. 4, pp. 66-74.
U.S. Appl. No. 13/422,914, filed Mar. 16, 2012, Communication Transmission System.
Huang et al., "M2M group delegate assignment," IEEE C802.16p-11/0330r1, Dec. 2011.
3GPP TS 36.304: "Evolved Universal Terrestrial Radio Access (E-UTRA) User Equipment (UE) Procedures in idle mode (Release 9)", 2010.
3GPP TR 23.888 v1.6.0, "3rdGeneration Partnership Project; Technical Specification Group Services and System Aspects; System Improvements for Machine-Type Communications; (Release 11)", Dec. 2011.
Tantra et al., "Throughput and delay analysis of IEEE 802.11e EDCA saturation," ICC 2005.
Nokia R2 071285, "3rd Generation Partnership Project: DRX parameters in LTE" 2007.
"IEEE 802.11", Wikipedia, The Free Encyclopedia, Wikimedia Foundation, Inc., Jun. 7, 2012, <http://en.wikipedia.org/wiki/IEEE_802.11>.
3GPP TS 36.300, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Mar. 2012.
3GPP TS 36.321, "3rd Generation Partnership Project; Technical Specification Group Radio Access Network; Evolved Universal Terrestrial Radio Access (E-UTRA); Radio Resource Control (RRC); Protocol specification (Release 10)", Mar. 2012.
3GPP TS 36.331, "3rd Generation Partnership Project; Technical Specification Group Radio Access Network; Evolved Universal Terrestrial Radio Access (E-UTRA); Medium Access Control (MAC) protocol specification (Release 10)", Mar. 2012.

\* cited by examiner

COMMUNICATION TRANSMISSION SYSTEM

FIELD

The embodiments discussed herein are related to wireless communication systems.

BACKGROUND

Radio access communication networks such as Long Term Evolution (LTE) and Long Term Evolution Advanced (LTE-A) networks may be used for machine to machine (M2M) communications, also known as machine type communications (MTC). Generally, MTC may allow a device to remotely report information over the radio access network to an MTC application and/or a MTC server that collects the information. Devices employing MTC may be used in a variety of situations. An example of such a situation may include smart meters that report resource consumption to a utility company server via the radio access communication network. Other examples of applications that may utilize MTC include security networks for use in surveillance, alarm systems or people tracking systems, transportation networks, fleet management, toll collection, emission control, electronic health (eHealth) applications; manufacturing monitoring and automation, and facility management, including home, building, and/or campus automation. Because of the number of applications, devices employing MTC on a given radio access communication network may have the potential to substantially outnumber the devices used for human to human (H2H) communication. Radio access communication networks have also seen a large growth in wireless data communication from its users. Future growth in data communications may lead to a deficit in spectrum available for radio access networks.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a delegate terminal may include a first wireless inter-terminal interface, a processing device, and a computer storage medium. The computer storage medium may have computer instructions stored thereon that are executable by the processing device to perform operations. The operations may include receiving transmissions from multiple terminals via the first wireless inter-terminal interface. The transmissions may be aggregated from the multiple terminals into an aggregated transmission. The aggregated transmission may be transmitted to a base station of a radio access network.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein may relate to a telecommunication system based on the 3rd Generation Partnership Project's (3GPP) Long Term Evolution (LTE) radio access network. Descriptions involving LTE may also apply to 3GPP's Long Term Evolution Advanced (LTE-A) radio access network. However, the embodiments described herein are not limited to the example telecommunication systems described. Rather, the embodiments described herein may be applicable to other communication systems. In addition, some embodiments are herein described in relation to devices employing machine-type communication (MTC). However, the embodiments described herein are not limited to MTC devices or MTC communication. Rather, the embodiments described herein may be applicable to other devices and other types of communication, including, but not limited to, user equipment (UE) communication with applications and/or servers. Some embodiments as herein described may be practiced in conjunction with embodiments described in U.S. patent application Ser. No. 13/422,914 filed Mar. 16, 2012, the entirety of which is herein incorporated by reference.

Embodiments of the present invention will be explained with reference to the accompanying drawings.

Figure 1:
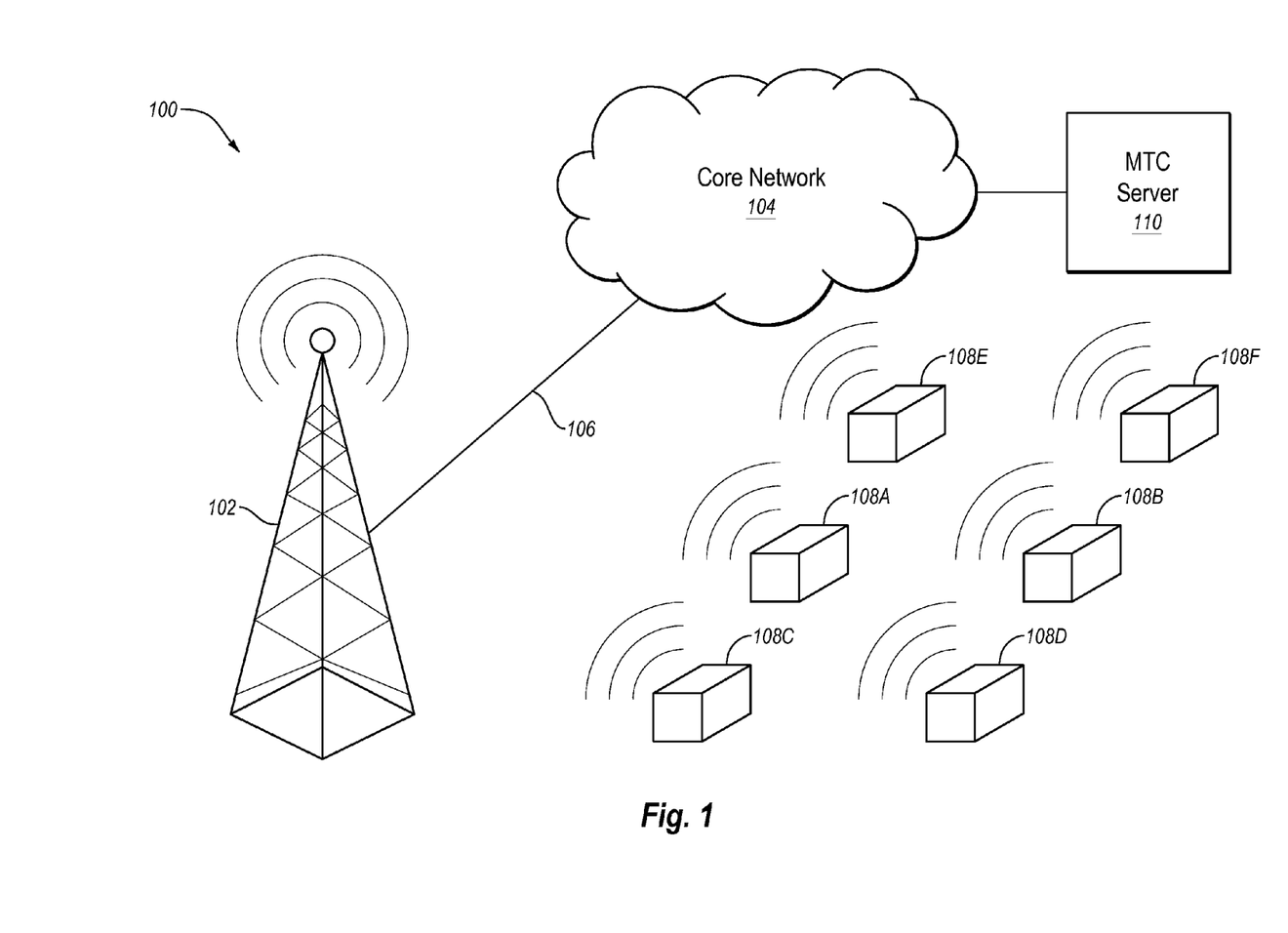
FIG. 1 illustrates an example network architecture of a telecommunication system.

FIG. 1 illustrates an example network architecture of a telecommunication system 100, arranged in accordance with at least some embodiments described herein. The telecommunication system 100 may include the network architecture of an Evolved Universal Mobile Telecommunications System (E-UMTS). The E-UMTS may include an LTE radio access network or the like. In some embodiments, the telecommunication system 100 may include an Evolved UMTS (Universal Mobile Telecommunications System) Terrestrial Radio Access Network (eUTRAN). In these and other embodiments, the radio access network may include a base station 102.

The base station 102 may include base station equipment, including hardware and/or software configured for communication with terminals 108A, 108B, 108C, 108D, 108E, 108F (collectively "terminals 108"), other base stations or a core network 104. The base station 102 may include one or more antenna for transmitting and receiving radio transmissions. In some embodiments, the base station 102 may include a core network communication interface 106. For example, the core network communication interface 106 may include an S1 interface as part of an LTE network. Generally, the base station 102 may provide wireless access to the radio access network for an area of land known as a cell. Although only one base station 102 is shown, the radio access network may include additional base stations, for example, to provide radio access to a large geographic area. In certain embodiments, the base station 102 may provide access for multiple cells. In some embodiments, the base station 102 may include one or more Evolved Node B (eNodeB) logical nodes, for example, as part of an LTE network.

The terminals 108 may include equipment to communicate wirelessly. For example, each terminal 108 may include hardware and/or software configured to allow communication with the base station 102 via a radio access interface of the corresponding terminal 108. In some embodiments, communication via a radio access interface may include the use of a band of wireless spectrum licensed for cellular radio access network communication. Alternately or additionally, the terminals 108 may include hardware and/or software configured to allow wireless communication via a wireless local area network (WLAN) via a WLAN interface of the corresponding terminal 108. As used herein, a radio access interface and/or a WLAN interface of a corresponding one of the terminals 108 may include the hardware and/or software of the corresponding terminal 108 that enables the corresponding terminal 108 to communicate via radio access network and/or a WLAN.

In some embodiments, communication via the WLAN interface may include communication over a band of unlicensed wireless spectrum. By way of example and not of limitation, the WLAN interface may communicate over a 2.4 GHz, 5 GHz, or 60 GHz band. In some embodiments, communication via the WLAN interface may be based on IEEE 802.11 standards. Alternately or additionally, the terminals 108 may include hardware and/or software configured to allow other wireless communication including, but not limited to, long wave (LW) magnetic signals, ZigBee®, Bluetooth®, infrared (IR), and the like.

The terminals 108 may include devices configured to communicate data via the telecommunication system 100. In these and other embodiments, the terminals 108 may include UE devices, including but not limited to, mobile phones, tablet computers, laptop computers and the like. Alternately or additionally, the terminals 108 may include devices configured for MTC communication with an MTC server 110 in communication with the core network 104. Examples of such devices may include, but are not limited to, surveillance and alarm devices, utility measuring and metering devices, manufacturing monitoring and automation devices, facility management devices, and the like.

In some embodiments, access procedures may be completed before the terminals 108 communicate directly with the base station 102 or other terminals 108 via the radio access interface of the corresponding terminal 108. Access procedures may include synchronizing with and performing a random-access procedure with the base station 102. The base station 102 may be associated with a cell within which the terminals 108 are located. Access procedures may include establishing a radio resource control (RRC) connection, for example, as part of access procedures in an LTE network. Alternately or additionally, other access procedures may be used.

In some embodiments, establishing an RRC connection for a terminal, for example, the terminal 108A, may include the following messaging steps. The terminal 108A may transmit a random access preamble allowing the base station 102 to estimate transmission timing of the terminal 108A. If the random access attempt is successful, the base station 102 may transmit a random access response. Transmitting the random access preamble and receiving the random access response may establish uplink synchronization and may allocate uplink resources to be used in later steps of the access procedure. If the random access attempt is not successful, the base station 102 may send a random access reject message and the terminal 108A may send another random access preamble. Terminal 108A may transmit another signal including a terminal identity, a buffer status report, or other data. In some embodiments, the base station 102 may respond by transmitting an RRC connection setup message. The RRC connection setup message may include configuration information necessary for the terminal 108A to communicate over the network via the base station 102. The terminal 108A may respond with an RRC connection setup complete message, which may include information for the base station 102 to complete the connection. The base station 102 may receive the connection setup complete message, and in response the terminal 108A may be considered connected to the base station 102. Alternately or additionally, other procedures may be employed to establish a connection between the terminal 108A and the base station 102.

The telecommunication system 100 may allow for discontinuous reception (DRX) cycles and/or discontinuous transmission (DTX) cycles. For instance, LTE networks may allow for DRX and DTX cycles. In some embodiments, employing a DRX cycle may allow a terminal, for example the terminal 108A, to cycle between periods of monitoring downlink (DL) transmissions, including control signals, and ignoring DL transmissions. During the periods when DL transmissions are ignored, reception circuitry may be switched off to reduce power consumption. Thus, monitoring DL transmissions for relatively short periods of time and switching the reception circuitry off for relatively long periods may allow a significant reduction of power consumption by the terminals 108. Similarly, for DTX, UL circuitry may be switched off when a device is not scheduled to transmit UL transmissions. In some embodiments, two cycles may be provided to a terminal, for example, a short cycle and a long cycle. For example, in an LTE network, a terminal may be provided a short cycle and a long cycle when the terminal is in an RRC CONNECTED state. Optionally, different DRX and/or DTX cycles may be provided to any of the terminals 108.

In some embodiments, the base station 102 may assign the terminals 108 resources for communicating with the base station 102 or other terminals 108 via the radio access interface. For example, the base station 102 may provide the terminals 108 UL transmission windows during which the terminals 108 may transmit transmissions. In these and other embodiments, the base station 102 may employ time division multiplexing (TDM) to schedule transmissions. For example, the base station 102 may schedule windows of time dedicated to receiving UL transmissions of the terminal 108A on a particular frequency band; outside of the dedicated time windows, the same frequency band may be used for DL transmissions or UL transmissions by other terminals 108 connected to the base station 102.

In some embodiments, the base station 102 and/or the terminals 108 may employ retransmission procedures for transmission error correction. For example, the base station 102 may employ hybrid automatic repeat request (HARQ). When employing HARQ, an entity, for example, the base station 102 or the terminal 108A, may transmit a transmission and then wait for a positive acknowledgement or a negative acknowledgement. If the transmitting entity receives a positive acknowledgement, the transmitting entity may transmit a new transmission. If the transmitting entity receives a negative acknowledgement, the transmitting entity may retransmit the same transmission. Alternately or additionally, the terminals 108 may employ retransmission procedures for transmission error correction over a WLAN interface.

The telecommunication system 100 may potentially experience some degradation of network performance. For example, the use of MTC on a large scale has the potential to degrade performance of the radio access network, including, but not limited to, degrading H2H communications over the radio access network. For example, the use of MTC on a large scale may degrade radio access network performance by demanding large signaling overhead to facilitate MTC transmissions. Systems that implement MTC transmissions may include a large number of MTC devices, each configured to regularly transmit a small amount of data to a corresponding MTC server, such as the MTC server 110. The radio access network performance may also be degraded when a large number of MTC devices send access requests to a base station at one time, potentially resulting in continuous collisions at a random access channel and degrading the radio access network performance of terminals communicating with the network via a base station, such as the base station 102. By way of example, a large number of MTC devices may attempt to establish a connection with the network at the same time, for example, when an MTC application and/or MTC server 110 malfunctions, an external event triggers MTC devices to report, and/or MTC devices are synchronized to connect with a base station and transmit reports at the same reporting times. If the base station 102 is experiencing a high congestion load, random access signaling attempts from individual devices, including at least some of terminals 108B-108F, may be rejected leading to both access delay and signaling overhead to the network. Some embodiments described herein may significantly reduce such access overhead and congestion.

In some embodiments, the terminals 108 may be assigned to a group including a delegate terminal. Groups may be formed based on characteristics of the terminals 108. For example, a group may be formed from terminals 108 with low mobility and high tolerance for transmission delay. However, other characteristics may include MTC features, server, subscriber, quality of service requirements, geographical deployments, or the like. Optionally, some or all of the terminals 108 assigned to the group may be further assigned to a batch and/or to different batches. A batch may be a subset of a group.

In some embodiments, terminals 108 may be assigned to a group and/or a batch when performing access procedures with the base station 102 for the first time. When each terminal 108 is assigned to the group or batch, each terminal 108 may be informed of its inclusion in the group. Each terminal 108 may further be informed of a group ID and/or batch ID, and whether the corresponding terminal 108 has been designated as the delegate terminal for the group. For example, the terminal 108A may be designated as the delegate terminal for a group including terminals 108A, 108B, 108C, 108D, 108E and 108F, and may be so informed. The terminal 108A will be hereinafter referred to as the "delegate terminal 108A" for convenience in the discussion that follows.

In some embodiments, the delegate terminal 108A may perform some procedures on behalf of the entire group. For example, the delegate terminal 108A may perform at least some part of access procedures on behalf of the entire group as described at least with respect to FIG. 2 and FIG. 3. The delegate terminal 108A may further perform at least some part of aggregating transmissions from at least some of the terminals 108 and transmitting the aggregated transmissions to the base station 102. In some embodiments, the delegate terminal 108A may aggregate transmissions from a batch of terminals 108 within the group, transmit the aggregated transmission to the base station 102, and then repeat with other batches within the group. In some embodiments, dividing a group into batches of terminals 108 may be based on the hardware and/or software capabilities of the delegate terminal 108A. For example, a batch size may be determined such that the aggregated transmission of a batch may be stored on an available memory of the delegate terminal 108A.

In some embodiments, the terminals 108 may be configured to communicate with each other over one or more of multiple inter-terminal interfaces of the corresponding terminals. For example, terminals 108 may communicate via a WLAN interface or a radio access interface. Communication via the radio access interface may include inter-terminal communication (also referred to as device-to-device (D2D) communications in some embodiments) using circuitry and/or wireless spectrum that allow the terminals 108 to communicate with the base station 102. In some embodiments, inter-terminal communication via the radio access interface may require scheduling resources through the base station 102. In some embodiments, inter-terminal communication via a WLAN interface may not require scheduling resources. For example, an infrastructure mode or an ad hoc mode provided by IEEE 802.11 standards may be used to communicate via the WLAN interface of the terminal(s) 108 and/or the base station 102. The infrastructure mode and ad hoc mode provided by IEEE 802.11 standards may include carrier sense multiple access with collision avoidance (CSMA/CA).

Figure 4:
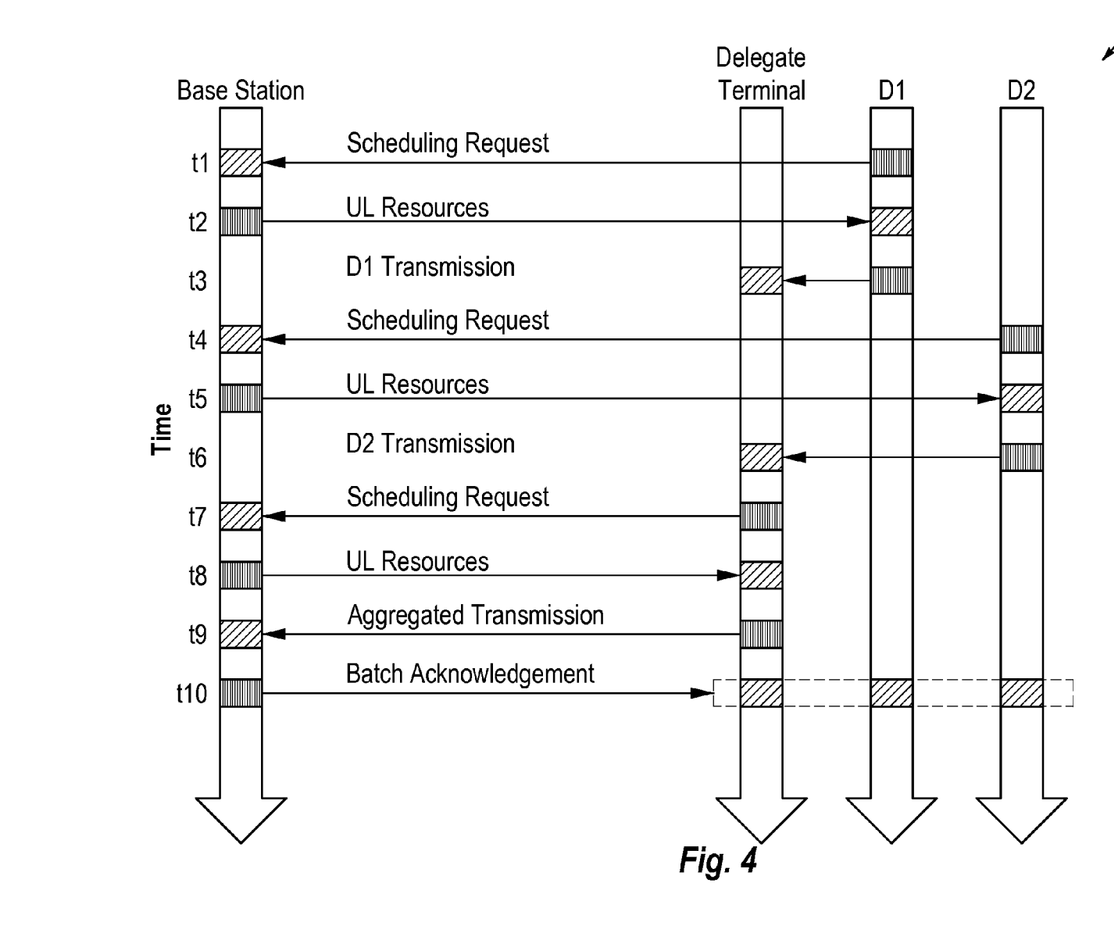
FIG. 4 illustrates an example batch transmission via a radio access interface that may be implemented in the telecommunication system of FIG. 1.
Figure 5:
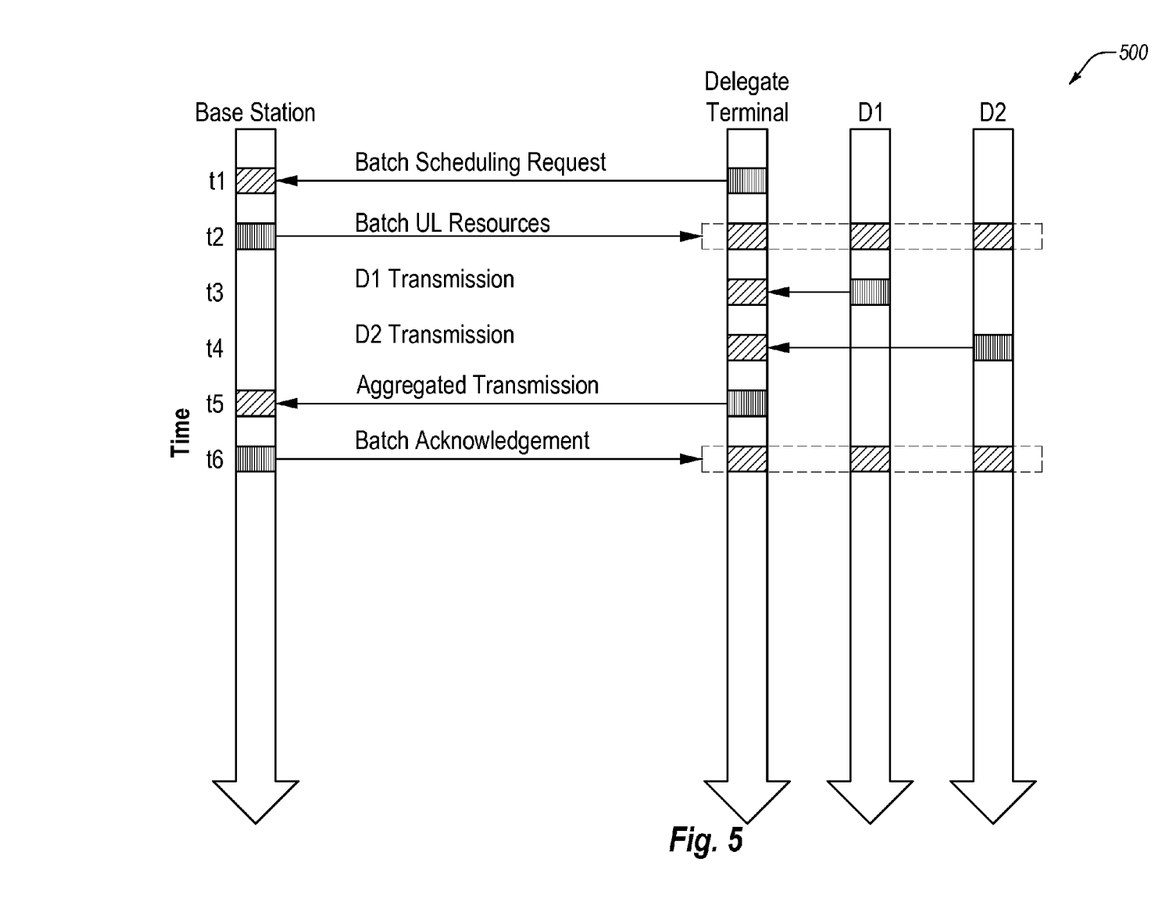
FIG. 5 illustrates another example batch transmission via a radio access interface that may be implemented in the telecommunication system of FIG. 1.

The delegate terminal 108A may receive transmissions from nondelegate terminals 108 via its radio access interface and transmit an aggregated transmission to the base station 102 as described at least with respect to FIG. 4 and FIG. 5. The delegate terminal 108A may receive transmissions from nondelegate terminals 108 via its WLAN interface and transmit an aggregated transmission to the base station 102 as described at least with respect to FIG. 6.

In some embodiments, the delegate terminal 108A may select the inter-terminal interface for receiving transmissions from nondelegate terminals 108. The inter-terminal interface may be selected based on a comparison of the utilities of the inter-terminal interfaces. The utilities of the inter-terminal interfaces may be based on a weighted sum of utility functions for different network attributes associated with the inter-terminal interfaces. In some embodiments, a utility for an inter-terminal interface may be determined by the following equation: Utility=[weight of delay]*[utility of delay]+[weight of cost]*[utility of cost]. Weight of delay and weight of cost may be determined according to a relative importance of associated attributes. Utility of delay may be proportional to the throughput of the network associated with the inter-terminal interface being evaluated. Utility of cost may represent an operator's revenue for providing access via the inter-terminal interfaces. In some embodiments, the utility of cost may be a constant value assigned to each inter-terminal interface. For example, utility of cost for a radio access interface may be larger than utility of cost for a WLAN interface to capture more revenue for allowing users access to the radio access network while capturing potential user satisfaction due to WLAN wide bandwidth and (potentially) decreased overall access delay. Alternately or additionally, the utility of cost may include a function based at least in part on the state of the radio-access network and/or WLAN. Alternately or additionally, other criteria may be used for determining the utility of or otherwise selecting inter-terminal interfaces.

In some embodiments, the inter-terminal interface may be selected for the entire group transmission, which may be described herein as a fixed interface selection. For example, the delegate terminal 108A may select a single inter-terminal interface to be used by each batch of terminals 108 to transmit transmissions to the delegate terminal 108A. In some embodiments, fixed interface selection may be based on a one-time determination and comparison of the utilities of each network associated with the inter-terminal interfaces. If the terminals 108 receive a group and/or batch setup message from the base station 102, it may imply to the terminals 108 that the terminals 108 may use their radio access interface to transmit transmissions to the delegate terminal 108A. If the terminals 108 receive a beacon frame from the delegate terminal 108A, it may imply to the terminals 108 that the terminals 108 may use their WLAN interface to transmit transmissions to the delegate terminal 108A. In some embodiments, when the terminals 108 may use their WLAN interface to transmit transmissions to the delegate terminal 108A, the terminals 108 may count the number of beacon frames received from the delegate terminal 108A. Alternately or additionally, the base station 102 may inform the terminals 108 of a batch index when broadcasting a batch acknowledgement message after a delegate terminal 108A aggregated transmission. When the counter value is equal to k, the terminals 108 assigned to the kth batch may contend for the WLAN channel to transmit transmissions to the delegate terminal 108A. Restricting the number of terminals 108 contending for the WLAN channel may reduce collision probability. In some embodiments, a fixed interface selection may allow the terminals 108 to turn off circuitry corresponding to one or more unused inter-terminal interfaces of each of the terminals 108 for a time, which may lead to power savings by the terminals 108.

In some embodiments, the delegate terminal 108A may select the inter-terminal interface for each batch of transmissions based on repeated determination and comparison of the utilities of each network associated with the inter-terminal interfaces, which may be described herein as an opportunistic interface selection. For example, the delegate terminal 108A may determine a utility of available inter-terminal interfaces based on the current state of the networks before each batch transmission and select the inter-terminal interface with the largest utility. In some embodiments, opportunistic interface selection may maximize the total utility. The terminals 108 may periodically monitor the inter-terminal interfaces to determine the inter-terminal interface to be used for transmitting transmissions to the delegate terminal 108A. For example, the terminals 108 may periodically monitor batch setup messages from the base station using the radio access interface and beacon frames from the delegate terminal 108A. In some embodiments, the terminals 108 may count the number of batch setup messages received from the base station 102 as well as the number of beacon frames received from the delegate terminal 108A. Alternately or additionally, the base station 102 may inform the terminals 108 of a batch index when broadcasting a batch acknowledgement message after a delegate terminal 108A aggregated transmission. When the counter value is equal to k, the terminals 108 assigned to the kth batch may—depending on the inter-terminal interface chosen—be scheduled resources over the access network interface or may contend for the WLAN channel to transmit transmissions to the delegate terminal 108A.

In some embodiments, the delegate terminal 108A may select the inter-terminal interface for each batch of transmissions in a manner that maximizes a long-term utility while limiting switching between different inter-terminal interfaces, which may be described herein as a dynamic interface selection. For example, the delegate terminal 108A may consider a utility of available inter-terminal interfaces based on the current and future projected state of the networks associated with the inter-terminal interfaces and select an inter-terminal interface that maximizes a long-term utility while limiting switching between different interfaces. In some embodiments, the current state and the future projected state of the networks may be based on the number of users connected to the network. In some embodiments, a penalty may be associated with switching the inter-terminal interfaces between batches of transmissions. For example, a determined utility may be increased when the inter-terminal interface is the same as the inter-terminal interface used for the previous batch transmission. Alternately or additionally, the determined utility may be decreased when the inter-terminal interface is not the same as the previous batch transmission. Statistical models may be used to evaluate the expected future payoff. In some embodiments, a Semi-Markov Decision Process (SMDP) may be used to determine the inter-terminal interface based on the future projected state of the networks associated with each inter-terminal interface. Dynamic interface selection may limit the signaling overhead for connection establishment and may conserve power consumption while maximizing the quality of experience (QoE) experienced by the terminals.

Figure 2:
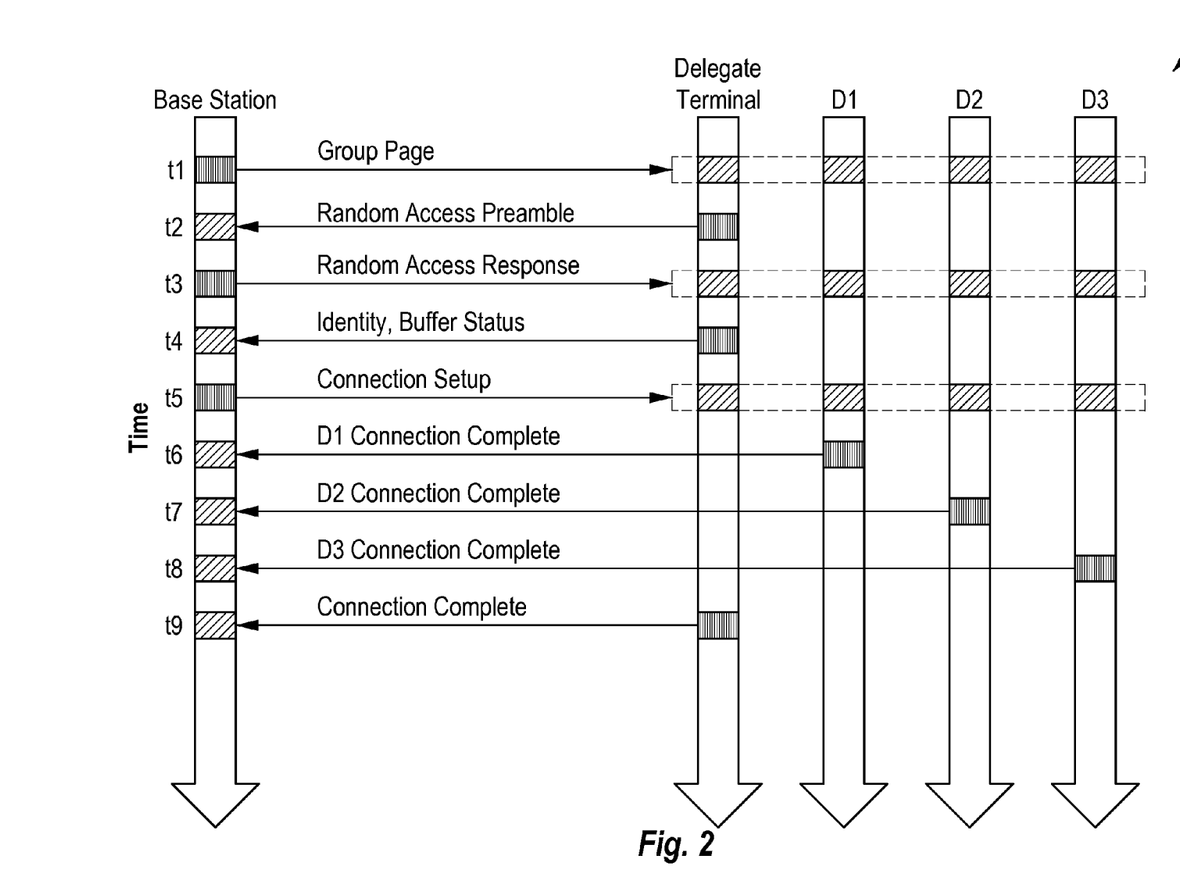
FIG. 2 illustrates an example connection process by a delegate terminal on behalf of a batch of terminals that may be implemented in the telecommunication system of FIG. 1.

FIG. 2 illustrates an example connection process by a delegate terminal on behalf of a batch of terminals that may be implemented in the telecommunication system 100 described with reference to FIG. 1, arranged in accordance with at least some embodiments described herein. As shown in FIG. 2, a base station may transmit and receive transmissions to and from a delegate terminal and devices D1, D2, and D3. The base station may generally correspond to the base station 102 of FIG. 1. The delegate terminal and the devices D1, D2, and D3 may respectively correspond to, e.g., the terminals 108A, 108B, 108C, and 108D of FIG. 1.

The delegate terminal and the devices D1-D3 may be assigned to a group and may further know the group ID of the assigned group. The delegate terminal may be designated as the delegate terminal of the group. Alternately or additionally, other devices may be assigned to the group, such as devices generally corresponding to devices including terminals 108E and 108F of FIG. 1. In some embodiments, the group may be divided into batches. For example, the devices D1-D3 may form a batch and the devices D1-D3 may be given a batch ID associated with their assigned batch. In some embodiments, the delegate terminal may be included in the batch with the devices D1-D3.

In the illustrated embodiment, the base station may send a group paging message, for example, at time t1. Although shown as being received by the delegate terminal and devices D1-D3, the group paging message may be received by more devices. For example, the group paging message may be received by each device in the group. An MTC server may prompt the base station to send the group paging message, for example, to request a data report. The MTC server may generally correspond to the MTC server 110 of FIG. 1.

The MTC server may know the delegate terminal and/or the devices D1-D3 have data to transmit. Alternately or additionally, the MTC server may be scheduled to prompt the group paging message. In some embodiments, the group paging message may include the group ID and information to be received by the delegate terminal and/or the devices D1-D3. The group paging message may be sent when the terminals are scheduled to monitor received signals according to a DRX cycle assigned to the delegate terminal and/or the devices D1-D3. The delegate terminal and the devices D1-D3 may receive the group paging message and process the information provided in the group paging message.

Alternately or additionally, the base station may not send a group paging message, but rather, the delegate terminal may initiate a connection procedure with the base station. For example, the delegate terminal may have data to transmit and/or may know that devices in the group may have data to transmit and may initiate the connection procedure so the data may be transmitted. In some embodiments, a device in the group may inform the delegate terminal that the device has data to transmit. Alternately or additionally, the delegate terminal may be scheduled to initiate the connection procedure. Alternately or additionally, an external event may prompt the delegate terminal to initiate the connection procedure.

In some embodiments, the delegate terminal may initiate an RRC connection establishment as already described above with respect to FIG. 1. In more detail, and with reference to FIG. 2, establishing the RRC connection may include transmitting a random access preamble at t2. If the random access preamble is successfully received at the base station, the base station may transmit a random access response at t3. The random access response may be received and processed by the delegate terminal and the devices D1-D3. The random access response may be received and processed by all devices in a batch. In some embodiments, the delegate terminal transmits another signal at t4 that may include a terminal identity, a buffer status report, or other information.

The base station may respond to the terminal identity and buffer status report by transmitting a batch connection setup message at t5. The batch connection setup message may be received and processed by the delegate terminal and the devices D1-D3. The batch connection setup message may contain the group ID and the batch ID such that the delegate terminal and the devices D1-D3 may identify the group setup message. In some embodiments, receiving the batch connection setup message from the base station may imply to the devices D1-D3 that the devices D1-D3 may use their respective radio access interface to transmit transmissions to the delegate terminal. In response to receiving the batch connection setup message, each device D1-D3 may transmit a connection complete message to the base station at t6-t8 and the delegate terminal may transmit a connection complete message at t9. Connection complete messages may be transmitted in the illustrated order and/or in any other order. The connection complete messages may be received at the base station; as a result, the delegate terminal and the devices D1-D3 may be considered connected to the base station.

Figure 3:
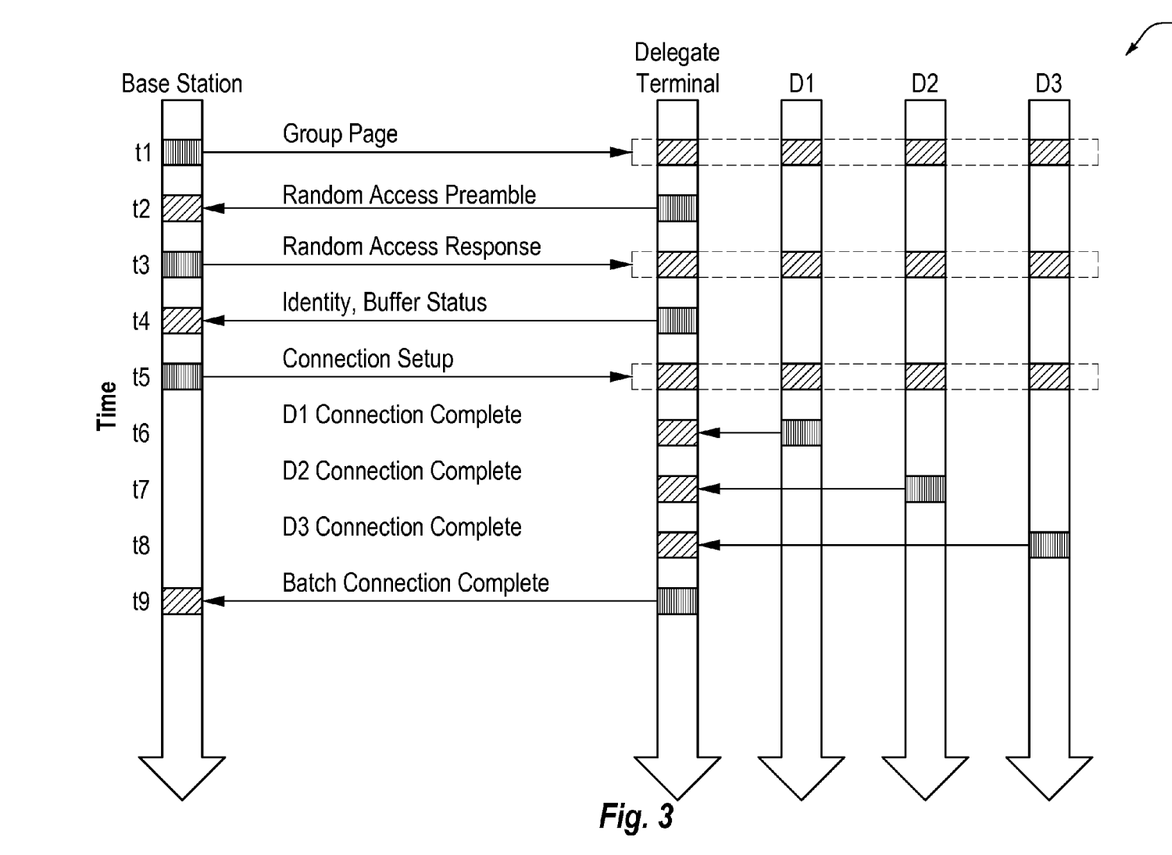
FIG. 3 illustrates another example connection process by a delegate terminal on behalf of a batch of terminals that may be implemented in the telecommunication system of FIG. 1.

FIG. 3 illustrates another example connection process by to delegate terminal on behalf of a batch of terminals that may be implemented in the telecommunication system 100 described with reference to FIG. 1, arranged in accordance with at least some embodiments described herein. The base station, delegate terminal, and devices D1-D3 described with respect to FIG. 3 may generally correspond to the base station, delegate terminal, and devices D1-D3 as described with reference to FIG. 2. The portion of the connection process at times t1-t5 may generally correspond to the portion of the connection process at times t1-t5 as described with reference to FIG. 2.

In some embodiments, the devices D1-D3 may transmit connection complete messages to the delegate terminal at t6-t8 rather than to the base station. In some embodiments, the devices D1-D3 may transmit the connection complete messages to the delegate terminal at a reduced power. Transmitting the connection complete messages at a reduced power may reduce signaling overhead to the base station and/or may enable the base station to grant resources that would have been granted to the devices D1-D3 to one or more other devices or users. The delegate terminal may transmit a batch connection complete message to the base station on behalf of the delegate terminal and the devices D1-D3 at t9.

FIG. 4 illustrates an example batch transmission via a radio access interface that may be implemented in the telecommunication system 100 described with reference to FIG. 1, arranged in accordance with at least some embodiments described herein. The base station, delegate terminal, and devices D1 and D2 illustrated in FIG. 4 may generally correspond to the base station, delegate terminal, and devices D1 and D2 as described with respect to FIG. 2 and FIG. 3. In some embodiments, the example batch transmission illustrated in FIG. 4 may occur after the delegate terminal and the devices D1 and D2 have performed a connection process. For example, the delegate terminal and the devices D1 and D2 may perform a connection process as described with reference to FIG. 2 and/or FIG. 3.

In some embodiments, at time t1, the device D1 may transmit a scheduling request to the base station to request UL resources to transmit a transmission to the delegate terminal. At t2, the base station may transmit a message identifying UL resources for the device D1 to transmit the transmission to the delegate terminal. At t3, the device D1 may transmit the transmission to the delegate terminal. At t4, the device D2 may transmit a scheduling request to the base station to request UL resources to transmit a transmission to the delegate terminal. At t5, the base station may send a message identifying UL resources for the device D2 to transmit the transmission to the delegate terminal. At t6, the device D2 may transmit the transmission to the delegate terminal. At t7, the delegate terminal may transmit a scheduling request to the base station to request UL resources to transmit an aggregated transmission to the base station. At t8, the base station may send a message identifying UL resources for the delegate terminal to transmit the aggregated transmission to the base station. At t9, the delegate terminal may transmit the aggregated transmission to the base station. The aggregated transmission may include the transmissions received by the delegate terminal at t3 and t6. At t10, the base station may transmit a batch acknowledgement to the delegate terminal and the devices D1 and D2. In some embodiments, if a device receives a negative acknowledgement, the device may retransmit the transmission to the delegate terminal to be retransmitted to the base station.

FIG. 5 illustrates another example batch transmission via a radio access interface that may be implemented in the telecommunication system 100 described with reference to FIG. 1, arranged in accordance with at least some embodiments described herein. The base station, delegate terminal, and devices D1 and D2 illustrated in FIG. 5 may generally correspond to the base station, delegate terminal, and devices D1 and D2 as described with reference to FIG. 2, FIG. 3, and FIG. 4. The example batch transmission illustrated in FIG. 5 may occur after the delegate terminal and the devices D1 and D2 have performed a connection process. For example, the delegate terminal and the devices D1 and D2 may perform a connection process as described with reference to FIG. 2 and/or FIG. 3.

In some embodiments, at time t1, the delegate terminal may transmit a batch scheduling request to the base station. The batch scheduling request may request UL resources for devices D1 and D2 to transmit transmissions to the delegate terminal and UL resources for the delegate terminal to transmit an aggregated transmission to the base station. At t2, the base station may transmit a message identifying UL resources for the delegate terminal and the devices D1 and D2. At t3, the device D1 may transmit its transmission to the delegate terminal. At t4, the device D2 may transmit its transmission to the delegate terminal. At t5, the delegate terminal may transmit an aggregated transmission to the base station. At t6, the base station may transmit a batch acknowledgement to the delegate terminal and the devices D1 and D2. In some embodiments, if a device receives a negative acknowledgement, the device may retransmit the transmission to the delegate terminal to be retransmitted to the base station.

In some embodiments, a batch transmission over a radio access network—for example, a batch transmission as described with reference to FIG. 4 and/or FIG. 5—may alleviate spectrum congestion. For example, radio access network resources allocated to the device-to-delegate-terminal transmissions may be re-used by the telecommunications network. Alternately or additionally, devices capable of communicating with other devices over a WLAN may alleviate spectrum congestion by employing their respective WLAN interfaces to transmit device-to-device transmissions.

Figure 6:
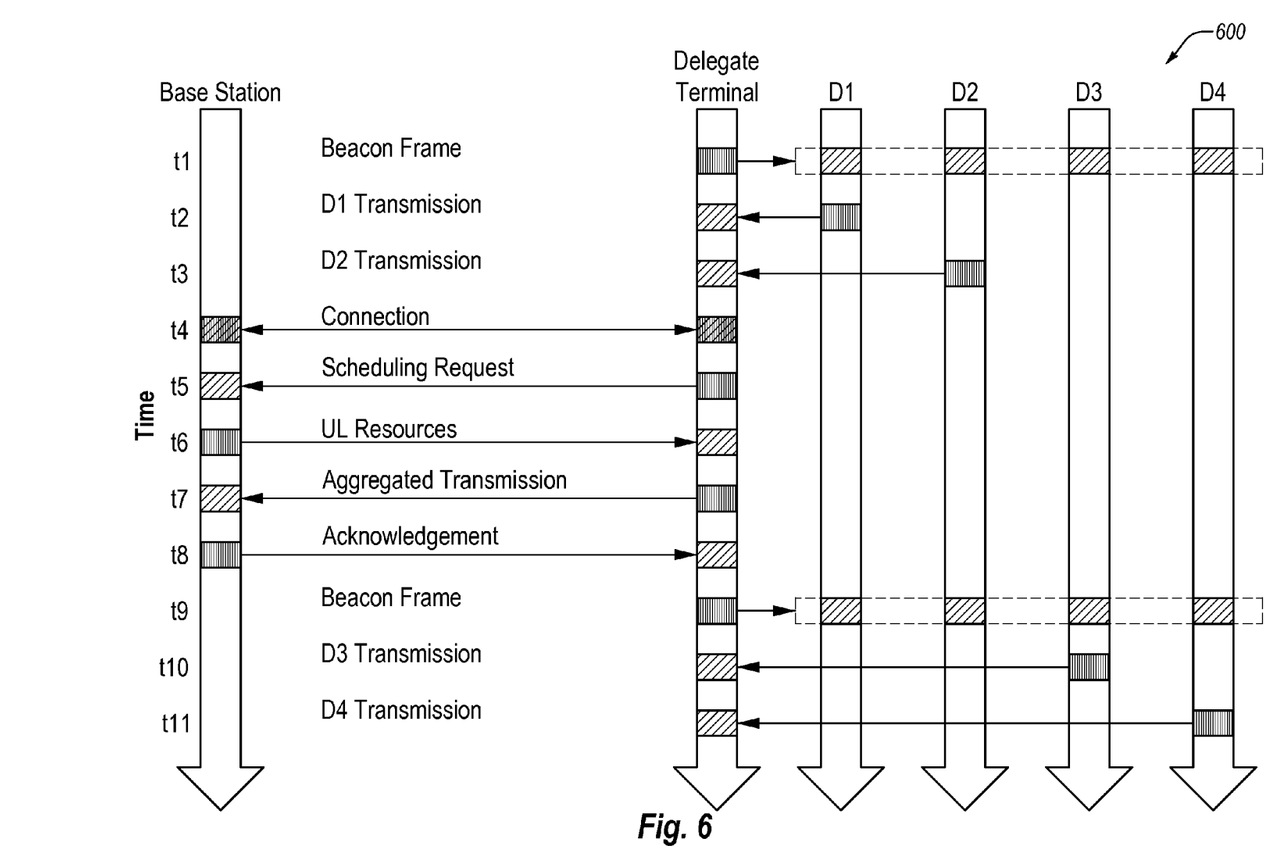
FIG. 6 illustrates an example batch transmission via a wireless local area network (WLAN) interface that may be implemented in the telecommunication system of FIG. 1.

FIG. 6 illustrates an example batch transmission via a WLAN interface that may be implemented in the telecommunication system 100 described with reference to FIG. 1, arranged in accordance with at least some embodiments described herein. The base station and delegate terminal illustrated in FIG. 6 may generally correspond to the base station and delegate terminal as described with reference to FIG. 2 through FIG. 5. The devices D1, D2, D3, and D4 illustrated in FIG. 6 may generally correspond to the terminals 108A, 108B, 108C, 108D, and 108E of FIG. 1 and/or the devices described with reference to FIG. 2 through FIG. 5.

In some embodiments, at time t1, the delegate terminal may transmit a beacon frame to the devices D1-D4 via a WLAN interface of the delegate terminal. In some embodiments, receiving the beacon frame may imply to the devices D1 and D2 that the devices D1 and D2 may use their WLAN interface to transmit transmissions to the delegate terminal. In some embodiments, the devices D1 and D2 may form a batch and the devices D3 and D4 may form another batch. Accordingly, the devices D1 and D2 may be assigned to a first batch and may know to transmit after a first beacon frame based on the assignment. At t2, the device D1 may transmit its transmission to the delegate terminal via the WLAN interface of the device D1, which transmission may be transmitted over a corresponding WLAN and then received at the delegate terminal via the WLAN interface of the delegate terminal. At t3, the device D2 may transmit its transmission to the delegate terminal via the WLAN interface of the device D2. In some embodiments, an acknowledgement may be sent from the delegate terminal to the devices D1 and D2 after transmissions have been received from each and/or both of the devices D1 and D2.

At t4, the delegate terminal may perform a connection procedure with the base station. For example, the delegate terminal may perform a connection procedure generally corresponding to the connection procedure described with reference to FIG. 1. The connection procedure as illustrated in FIG. 6 is condensed for clarity.

At t5, the delegate terminal may transmit a scheduling request to the base station for resources for the delegate to transmit an aggregated transmission to the base station. At t6, the base station may transmit a message identifying UL resources for the delegate terminal. At t7, the delegate terminal may transmit an aggregated transmission to the base station. The aggregated transmission may include the transmissions from the devices D1 and D2. The base station may transmit an acknowledgement to the delegate terminal at t8. In some embodiments, if the delegate terminal receives a negative acknowledgement, the delegate terminal may retransmit part or all of the aggregated transmission to the base station.

With continued reference to FIG. 6, the devices D3 and D4 may be assigned to a second batch and may know, based on the assignment, to transmit after a second beacon frame. Accordingly, at t9, the delegate terminal may transmit a second beacon frame to the devices D1-D4 via its WLAN interface. In some embodiments, receiving the second beacon frame may imply to the devices D3 and D4 that the devices D3 and D4 may use their WLAN interfaces to transmit transmissions to the delegate terminal. At t10, the device D3 may transmit its transmission to the delegate terminal via a WLAN interface of the device D3. At t11, the device D4 may transmit its transmission to the delegate terminal via a WLAN interface of the device D4. The delegate terminal may then send another scheduling request and upload an aggregated transmission including the transmissions from the devices D3 and D4. For example, although not illustrated, the delegate terminal may perform steps following time t11 that are analogous to the steps illustrated at t5-t8.

Figure 7:
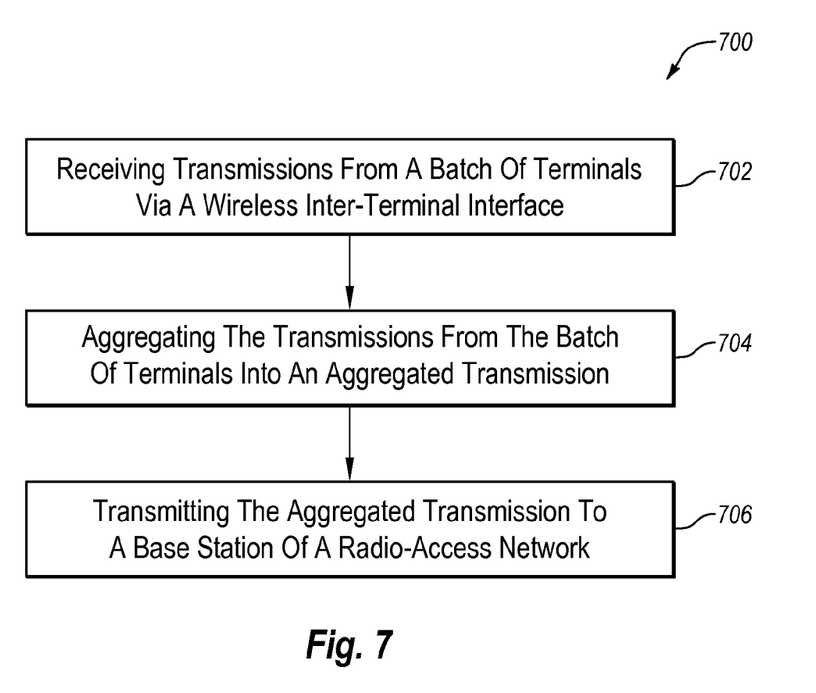
FIG. 7 is a flow chart of an example method of relaying a group transmission that may be implemented in the telecommunication system of FIG. 1, all arranged in accordance with at least some embodiments described herein.

FIG. 7 is a flow chart of an example method 700 of relaying a group transmission in a telecommunication system that may be implemented in the telecommunication system 100 described with reference to FIG. 1, arranged in accordance with at least some embodiments described herein. In some embodiments, the method 700 may be implemented, in whole or in part, by a delegate terminal. For example, the method 700 may be implemented by the delegate terminal 108A of FIG. 1. Alternately or additionally, a processing device such as a computer processing unit (CPU) of a delegate terminal may execute computer instructions stored on a computer storage medium of the delegate terminal to perform operations including those described with respect to FIG. 7. Although illustrated as discreet blocks, various blocks may be divided into additional blocks, combined into fewer blocks, or eliminated, depending on the desired implementation.

The method 700 may begin at block 702, in which transmissions may be received from a batch of terminals via a wireless inter-terminal interface of the delegate terminal.

In some embodiments, the inter-terminal interface may include a WLAN interface or a radio access interface.

In block 704, the transmissions from the batch of terminals may be aggregated into an aggregated transmission.

In block 706, the aggregated transmission may be transmitted to a base station of a radio access network. The radio access network may generally correspond to the telecommunication system 100 of FIG. 1. Alternately or additionally, the base station may generally correspond to the base station 102 of FIG. 1.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the method 700 may further include receiving transmissions from another batch of terminals via the same wireless inter-terminal interface of the delegate terminal. The transmissions from the other batch of terminals may be aggregated into an aggregated transmission and transmitted to the base station. Alternately or additionally, the transmission from the other batch of terminals may be received via a different wireless inter-terminal interface of the delegate terminal.

In some embodiments, the method 700 may further include receiving connection messages from the batch of terminals via a radio access interface and transmitting a bulk connection message indicating a connection status of the batch of terminals to the base station.

Alternately or additionally, the wireless inter-terminal interface may be selected from multiple wireless inter-terminal interfaces of the delegate terminal based at least in part on a utility of the wireless inter-terminal interfaces. In some embodiments, calculating the utility of the wireless inter-terminal interfaces may include estimating a future utility of the wireless inter-terminal interfaces. The wireless inter-terminal interface for receiving transmissions from other batches of terminals may be reselected based at least in part on a recalculated utility of the wireless inter-terminal interfaces. In some embodiments, reselecting the wireless inter-terminal interface may be based at least in part on the wireless inter-terminal interface used to receive transmissions from the previous batch. Reselecting the wireless inter-terminal interface may also be based at least in part on an interface switching preference. For example, an interface switching preference may be set such that the inter-terminal interface is switched only when the (long-term) utility improvement is relatively high.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including random-access memory (RAM), read-only memory (ROM), electrically erasable programmable read-only memory (EEPROM), compact disc read-only memory (CD-ROM) or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A terminal comprising:
a first wireless inter-terminal interface;
a processing device; and
a computer storage medium having computer instructions stored thereon that are executable by the processing device to perform operations comprising:
receiving instructions designating the terminal as a delegate terminal for a group of terminals including the terminal, a first batch of terminals, and a second batch of terminals different from the first batch of terminals;
receiving transmissions from the first batch of terminals via the first wireless inter-terminal interface while designated as the delegate terminal for the group of terminals including the first batch of terminals and the second batch of terminals;
aggregating the transmissions from the first batch of terminals into a first aggregated transmission;
transmitting the first aggregated transmission to a base station of a radio access network;
receiving transmissions from the second batch of terminals via the first wireless inter-terminal interface while designated as the delegate terminal for the group of terminals including the first batch of terminals and the second batch of terminals;

aggregating the transmissions from the second batch of terminals into a second aggregated transmission; and transmitting the second aggregated transmission to the base station of the radio access network.

2. The terminal of claim 1, the terminal further comprising a second wireless inter-terminal interface, and the group of terminals further including a third batch of terminals different from the first batch of terminals and the second batch of terminals, the operations further comprising:

receiving transmissions from the third batch of terminals via the second wireless inter-terminal interface;

aggregating the transmissions from the third batch of terminals into a second third aggregated transmission; and transmitting the third aggregated transmission to the base station of the radio access network.

3. The terminal of claim 2, the operations further comprising:

selecting the first wireless inter-terminal interface from a plurality of wireless inter-terminal interfaces of the terminal based at least in part on a first utility of each of the plurality of wireless inter-terminal interfaces; and selecting the second wireless inter-terminal interface from the plurality of wireless inter-terminal interfaces based at least in part on a second utility of each the plurality of wireless inter-terminal interfaces.

4. The terminal of claim 2, the operations further comprising:

selecting the first wireless inter-terminal interface from a plurality of wireless inter-terminal interfaces of the terminal based at least in part on a first utility, including a first estimated future utility, of each of the plurality of wireless inter-terminal interfaces; and selecting the second wireless inter-terminal interface from the plurality of wireless inter-terminal interfaces based at least in part on:

a second utility, including a second estimated future utility, of each of the plurality of wireless inter-terminal interfaces, and the first wireless inter-terminal interface.

5. The terminal of claim 4, the operations further comprising selecting the second wireless inter-terminal interface from the plurality of wireless inter-terminal interfaces based at least in part on an interface switching preference.

6. The terminal of claim 1, wherein the first wireless inter-terminal interface includes at least one of a wireless local area network interface and a radio access interface.

7. The terminal of claim 1, the operations further comprising selecting the first wireless inter-terminal interface from a plurality of wireless inter-terminal interfaces of the delegate terminal based at least in part on a utility of each of the plurality of wireless inter-terminal interfaces.

8. The terminal of claim 1, wherein the first wireless inter-terminal interface includes a radio access interface, the operations further comprising:

receiving connection messages from the first batch of terminals via the radio access interface of the first wireless inter-terminal interface; and transmitting a bulk connection message to the base station, the bulk connection message configured to indicate a connection status of the first batch of terminals.

9. A method for relaying a group transmission in a telecommunication system, the method comprising:

receiving instructions at a terminal, the instructions designating the terminal as a delegate terminal for a group of terminals including the terminal, a first batch of terminals, and a second batch of terminals different from the first batch of terminals;

receiving transmissions from the first batch of terminals via a first wireless inter-terminal interface while designated as the delegate terminal for the group of terminals including the first batch of terminals and the second batch of terminals;

aggregating the transmissions from the first batch of terminals into a first aggregated transmission;

transmitting the first aggregated transmission to a base station of a radio access network;

receiving transmissions from the second batch of terminals via the first wireless inter-terminal interface while designated as the delegate terminal for the group of terminals including the first batch of terminals and the second batch of terminals;

aggregating the transmissions from the second batch of terminals into a second aggregated transmission; and transmitting the second aggregated transmission to the base station of the radio access network.

10. The method of claim 9, further comprising:

receiving transmissions from a third batch of terminals of the group of terminals via a second wireless inter-terminal interface;

aggregating the transmissions from the third batch of terminals into a third aggregated transmission; and transmitting the third aggregated transmission to the base station of the radio access network.

11. The method of claim 10, further comprising:

selecting the first wireless inter-terminal interface from a plurality of wireless inter-terminal interfaces based at least in part on a first utility of each of the plurality of w ireless inter-terminal interfaces; and selecting the second wireless inter-terminal interface from the plurality of wireless inter-terminal interfaces based at least in part on a second utility of each of the plurality of wireless inter-terminal interfaces.

12. The method of claim 10, further comprising:

selecting the first wireless inter-terminal interface from a plurality of wireless inter-terminal interfaces based at least in part on a first utility, including a first estimated future utility, of each of the plurality of wireless inter-terminal interfaces; and selecting the second wireless inter-terminal interface from the plurality of wireless inter-terminal interfaces based at least in part on:

a second utility, including a second estimated future utility, of each of the plurality of wireless inter-terminal interfaces, and the first wireless inter-terminal interface.

13. The method of claim 12, further comprising selecting the second wireless inter-terminal interface from the plurality of wireless inter-terminal interfaces based at least in part on an interface switching preference.

14. The method of claim 9, wherein the first wireless inter-terminal interface includes at least one of a wireless local area network interface and a radio access interface.

15. The method of claim 9, further comprising selecting the first wireless inter-terminal interface from a plurality of wireless inter-terminal interfaces of the delegate terminal based at least in part on a utility of each of the plurality of wireless inter-terminal interfaces.

16. The method of claim 9, further comprising:
receiving connection messages from the first batch of terminals via a radio access interface of the first wireless inter-terminal interface; and
transmitting a bulk connection message to the base station, the bulk connection message configured to indicate a connection status of the first batch of terminals.

* * * * *